(No Model.)
A. C. HOWES.
FRUIT GATHERER.
No. 406,097. Patented July 2, 1889.
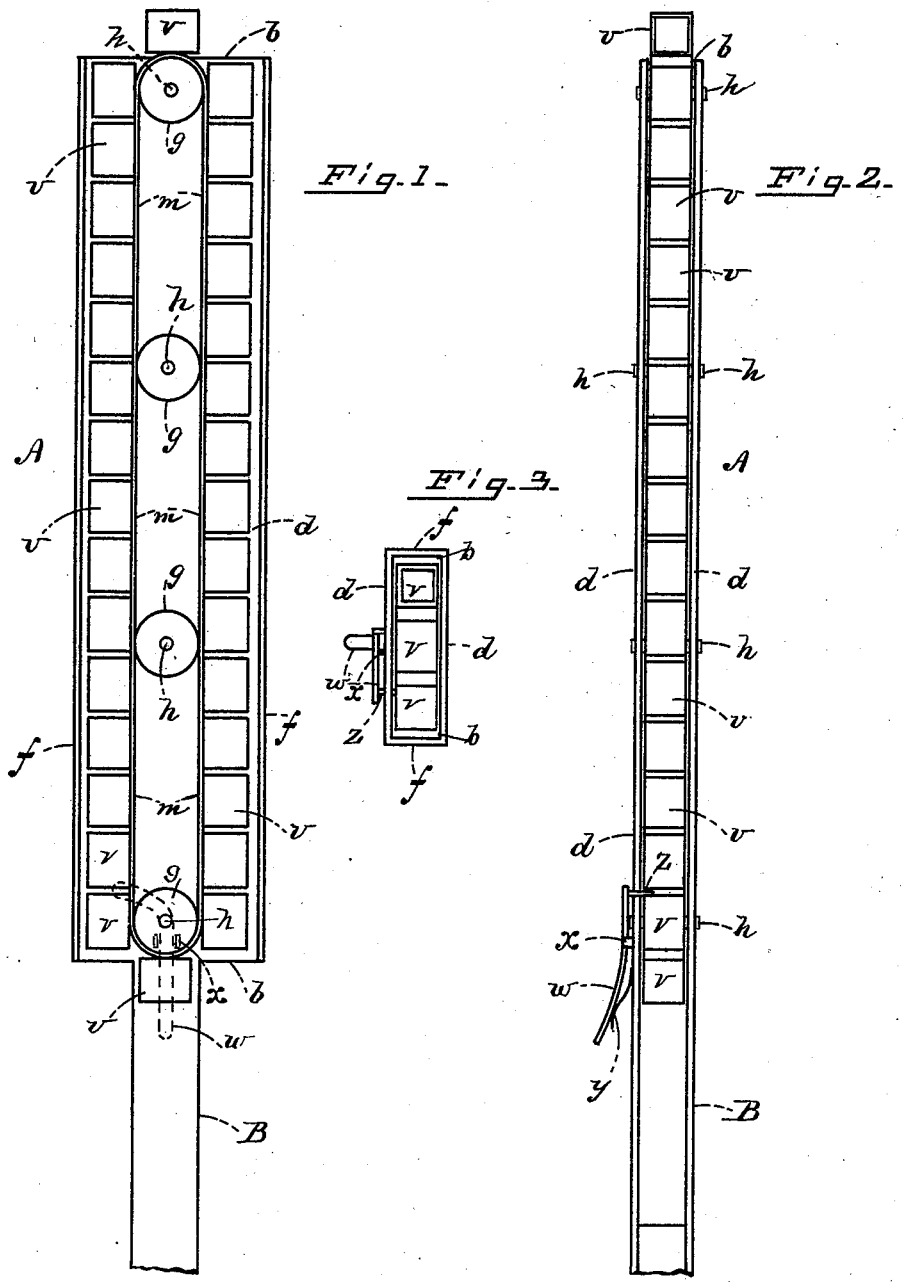
Witnesses:
Helen M. Finegan
N. Dunfee
Inventor:
Alvin C. Howes,
per C. A. Shawalee,
Attys.

UNITED STATES PATENT OFFICE.

ALVIN C. HOWES, OF MIDDLEBOROUGH, MASSACHUSETTS.

FRUIT-GATHERER.

SPECIFICATION forming part of Letters Patent No. 406,097, dated July 2, 1889.

Application filed January 30, 1889. Serial No. 298,037. (No model.)

*To all whom it may concern:*

Be it known that I, ALVIN C. HOWES, of Middleborough, in the county of Plymouth, State of Massachusetts, have invented a certain new and useful Improvement in Fruit-Gatherers, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved fruit-gatherer, one of the side pieces being removed to show the interior; Fig. 2, an edge elevation of the same, the edge piece being removed; and Fig. 3, a top plan view.

Like letters of reference indicate corresponding parts in the different figures of the drawings.

My invention relates to that class of fruit-gatherers by which the fruit may be gathered from the trees and transported to the ground; and it consists in certain novel features, as hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body of the fruit-gatherer, which consists of a rectangular box open at each end $b$, and is constructed of two broad side pieces $d$, connected by edge pieces $f$. The side pieces $d$ are extended centrally at one end to form a handle B. Rolls $g$ are journaled centrally in the body A by means of trunnions $h$, disposed in the side pieces $d$. Disposed on said rolls there is an endless belt $m$, provided on its outer face with a series of cups or holders $v$, said holders being open at their tops or upper ends when viewed in the position shown at the right in Fig. 1, the mouth of each holder $v$ being in its horizontal end (see Fig. 2) as it passes over the upper roll $g$. A lever $w$ is pivoted at $x$ to one side piece $d$, adjacent to the handle B, its short arm (see Fig. 1) being bent laterally and provided with a pin $z$, (see Fig. 2,) which projects through an opening in the side piece and between the holders $v$. A flat spring $y$, secured to the handle B, engages the long arm of the lever and acts expansively to hold the pin $z$ in the path of the holders.

In the use of my improvement the top of the gatherer is forced upward into the tree, so that the fruit on being detached will fall into the holder $v$ at the right of the upper wheel $g$, as viewed in Fig. 1. The long arm of the lever $w$ being depressed, thus withdrawing its pin $z$ from the path of the holders, the weight of the fruit in an upper holder will cause the belt to move on its rolls $g$ and said holder to descend. The operator continuing to fill in like manner succeeding holders on the same side of the upper roll $g$, the belt is kept in motion by the weight of the fruit, which is delivered therefrom through the lower end of the body A as each holder passes around the lower roll $g$, and is thereby inverted.

It will be seen that in the use of my improvement the fruit may readily be gathered without being crushed or bruised, the operator easily catching the fruit as it falls from the holder.

Having thus explained my invention, what I claim is—

1. In a fruit-gatherer, the combination of a rectangular body open at both ends and provided with a handle, wheels journaled centrally in said body, an endless belt traveling in the body on said wheels, a series of cups or holders secured to said belt, and a spring-actuated catch mounted on the body for preventing said belt from traveling on said wheels, substantially as described.

2. In a fruit-gatherer, the combination of the body A, open at $b\ b$ and having the handle B, the wheels $g$, journaled in said body, the endless belt $m$, traveling in the body, disposed on said wheels and provided with the holders $v$, the lever $w$, pivoted on the body and provided with the pin $z$, and the spring $y$, for projecting said pin into the path of said holders, substantially as described.

ALVIN C. HOWES.

Witnesses:
 GEORG H. SHAW,
 FREDERICK D. LEAR.